United States Patent [19]

Weston

[11] 4,063,920
[45] Dec. 20, 1977

[54] REDUCING SETTLING RATE OF POST-PRECIPITATE IN FERTILIZER SOLUTION BY CHLORIDE ADDITION

[75] Inventor: Charles W. Weston, Yazoo City, Miss.

[73] Assignee: Mississippi Chemical Corporation, Yazoo City, Miss.

[21] Appl. No.: 724,579

[22] Filed: Sept. 20, 1976

[51] Int. Cl.² .............................................. C05B 7/00
[52] U.S. Cl. ......................................... 71/34; 71/39; 71/43; 252/351
[58] Field of Search .................... 71/34, 39, 47, 43; 252/8.5 B, 351

[56] References Cited
U.S. PATENT DOCUMENTS

| 3,711,268 | 1/1973 | Frazier | 71/34 |
| 3,861,897 | 1/1975 | Frazier | 71/34 |
| 3,918,952 | 11/1975 | Neumiller | 71/34 X |

Primary Examiner—Frank A. Spear, Jr.
Assistant Examiner—Ferris H. Lander
Attorney, Agent, or Firm—Oblon, Fisher, Spivak, McClelland & Maier

[57] ABSTRACT

Precipitate settling in ammonium polyphosphate liquid fertilizer solutions containing magnesium, iron, aluminum compound impurities, prepared by concentrating and ammoniating wet process orthophosphoric acid, is impeded by addition to the ammonium polyphosphate, prior to precipitate formation, a source of Cl⁻ in amounts sufficient to alter the morphology of the precipitate crystals such that the length-to-width ratio of the crystals formed is increased by at least 200%, as compared to the ratio for crystals formed in the absence of Cl⁻ addition. Since there is little propensity for the longer and thinner crystals to settle out of solution, the crystals remain innocuously suspended in the solution.

15 Claims, 3 Drawing Figures

POST-PRECIPITATE FROM AMMONIUM POLYPHOSPHATE
LIQUID FERTILIZER TREATED WITH 2.5% (wt.) KCl (1000X)

POST-PRECIPITATE FROM UNTREATED AMMONIUM
POLYPHOSPHATE LIQUID FERTILIZER (1000X)

POST-PRECIPITATE FROM AMMONIUM POLYPHOSPHATE
LIQUID FERTILIZER TREATED WITH 2.5% (wt.) KCl (1000X)

REDUCING SETTLING RATE OF POST-PRECIPITATE IN FERTILIZER SOLUTION BY CHLORIDE ADDITION

BACKGROUND OF THE INVENTION

1. Field of the Invention

The present invention relates to ammonium polyphosphate solutions, and more particularly to techniques for impeding the settling of precipitate out of said solutions.

2. Description of the Prior Art

In liquid fertilizers containing ammonium polyphosphate, the nitrogen and the phosphate content can vary considerably. For example, a typical product of ammonium polyphosphate liquid contains 10% nitrogen and 34% $P_2O_5$. Another possible grade of this product may be one containing 11% nitrogen and 37% $P_2O_5$. There are numerous other grades which can be made by varying the ratio of nitrogen of $P_2O_5$ as the product is manufactured or by addition of ammonia or water or other ingredients after the product is made. The $P_2O_5$ present in liquid fertilizers containing ammonium polyphosphate is typically in the range of 40–75% poluphosphate with the remaining 60–25% present as orthophosphate. Further, the polyphosphate is present in various forms such as pyro-, tripoly-, and longer chain polymers.

In manufacturing the liquid ammonium polyphosphate fertilizer, it is often desirable to use wet process phosphoric acid as a source of phosphate. The primary reason is that wet process phosphoric acid is the cheapest source of phosphate. When wet process orthophosphoric acid is used to make the ammonium polyphosphate fertilizer, the product will contain a number of impurities which were introduced with the wet process acid. Shortly after the ammoniation of the wet process phosphoric acid and subsequent condensation to ammonium polyphosphate, the impurities precipitate out of solution. It is know that these precipitates are chemicall complex salts of the forms: $MgAl(NH_4)_5(P_2O_7)_2F_2 \cdot 6H_2O$; $Mg(NH_4)_6(P_2O_7)_2 \cdot 6H_2O$; $(NH_4)_6AlF_6$; $Mg(NH_4)_2P_2O_7 \cdot 4H_2O$; $Al(NH_4)_2P_2O_7OH \cdot 3H_2O$, with the first of these being the predominant complex salt.

In one method of producing the liquid fertilizer, concentrated phosphoric acid is fed to a system where it is combined with anhydrous ammonia or other forms of ammonia. The wet process phosphoric acid is produced from the reaction of phosphate rock with sulfuric acid. A typical analysis of one type of wet process phosphoric acid is as follows:

| | |
|---|---|
| % $P_2O_5$ (Total) | 60 – 62) |
| % Polyphosphate | 0 |
| % MgO | 0.85 |
| % $Fe_2O_3$ | 2.0 |
| % $Al_2O_3$ | 1.8 |
| % F | 0.7 |

While the acid is clarified prior to concentration, the remaining impurities listed above create severe product quality problems.

After production of the liquid ammonium polyphosphate fertilizer, it is usually placed in storage for quite some time before it is applied to farm lands. It is seldom applied immediately after its production. It may remain in production storage, shipping vessels or customer storage tanks or systems for periods of several days to several months. During this period, complex material in the liquid precipitates and settles to the bottom of the container. Carbonized organics, typical of wet process phosporic acid, also settle out, compounding the problem. The organics, when mixed with other impurities settle to from a slimy, compact sludge layer. Often the entire liquid fertilizer will get to form a solid mass of material which cannot be readily removed from the storage containers. Sludge which forms in containers will compact to form a layer which is extremely difficult to remove. Settling in transportation vessels, storage tanks, and customer tanks results in product loss, handling problems, and high cost for cleaning tanks and equipment and general customer dissatisfaction.

This sludge material is also very difficult to apply to farm land. When the farmer or fertilizer applicator attempts to apply the liquid fertilizer to the soil, distributors or spray nozzles and equipment becomes plugged, requiring interruption of application to permit cleaning the pluggage out. Also, the pluggage results in uneven application to the soil of the liquid fertilizer and this results in extremely poor crop response because of poor utilization of the fertilizer nutrients. Therefore, solving the problem of the sludge formation becomes a major benefit.

In view of this serious precipitation problem, wet process orthophosphoric acid is not commonly used in the preparation of liquid ammonium polyphosphate fertilizers, or when it is used, it is used only in combination with economically unattractive procedures for eliminating the precipitate or for altering the nature of the precipitate so as to be less objectionable. For instance, it is known to attempt to solubilize the precipitate by the addition of fluoride ion to the solution prior to the crystal formation. One difficulty with this technique is the fact that the added fluorine renders the fertilizer toxic to animals, and hence, the fertilizer cannot be used as a feed supplement.

It is also known to try to suspend the crystals to prevent them from settling out. For instance, in Slack et al, U.S. Pat. Nos. 3,109,729 and 3,113,858, which refers to suspension type fertilizers, it is suggested to add clay to the solution which acts as a suspending agents. This technique, however, has not proven to be entirely satisfactory, since it increases the viscosity of fertilizer suspension and reduces the flowability and the clay settles to cause problems.

Preston, U.S. Pat. No. 3,183,073, discloses the addition of sugar to prevent precipitation in high analysis liquid ammonium polyphosphate fertilizers. The addition of the sugar is disclosed to maintain the impurity precipitates which occur when the ammonium polyphosphate is derived from wet process phosphoric acid in suspension.

Miller, U.S. Pat. No. 3,022,153 suggests delaying the formation of a precipitate by additon of urea to the wet process phosphoric acid prior to ammoniation. This technique is disclosed to yield a liquid ammonium orthophosphate fertilizer solution which is stable for only 3–4 days before precipitation begins to occur. Miller indicates that if the fertilizer solution is to be held for longer than 3–4 days, it is necessary to add an amine after the completion of the ammoniation step. However, the addition of amine raises the pH of the fertilizer solution which can cause precipitation of the nutrients in the solution.

Burch et al, U.S. Pat. No. 3,625,672, discloses another technique for avoiding precipitation of magnesium impurities in liquid fertilizer solutions prepared by ammoniating wet process phosphoric acid. The technique of Burch et al is to ammoniate the wet process phosphoric acid until a pH of from 6.0 to 6.2 is achieved, then to add concentrated nitric acid to attain a pH from 5.0 to 5.6. In this manner, the tendency of the magnesium impurities to precipitate is reduced. However, it has been found that the addition of nitric acid alone only delays the formation of the objectionable precipitate, but does not prevent its formation.

Accordingly, a need continues to exist for a method which is capable of preventing the problems associated with precipitate formation in liquid fertilizers containing polyphosphate, which is prepared form wet process orthophosphoric acid or from wet process superphosphoric acid and hence is storage stable over extended periods of time without substantial precipitate settlement.

SUMMARY OF THE INVENTION

It is, therefore, one object of the present invention to provide a method for precluding settling of the precipitate which forms from liquid ammonium polyphosphate fertilizers when prepared by concentrating and ammoniating wet process orthophosphoric acid.

Another object of the present invention is to reduce the rate at which the precipitate formation occurs in liquid fertilizers containing ammonium polyphosphate when prepared by concentrating and ammoniating wet process orthophosphoric acid or wet process superphosphoric acid.

It is yet another object of the present invention to provide a liquid fertilizer containing ammonium polyphosphate prepared by concentrating and ammoniating wet process orthosphosphoric acid or wet process superphosphoric acid which may be stored without the occurrence of sludge formation.

These and other objects and the present invention, as will hereinafter become better understood, have been attained by impeding the settling of precipitation crystals in liquid fertilizers containing ammonium polyphosphate prepared by concentrating and ammoniating wet process phosphoric acid or wet process superphosphoric acid which comprises adding a quantity of chloride ions to the liquid fertilizer solution in amounts sufficient to alter the morphology of the precipitate crystals such that the length to width ratio of the crystals formed is increased by at least 200% as compared to the same ratio for crystals formed in the absence of Cl−addition.

In a preferred embodiment of the present invention, a source of potassium ions is also added to the ammonium polyphosphate solution.

DESCRIPTION OF THE PREFERRED EMBODIMENTS

Figure 1:
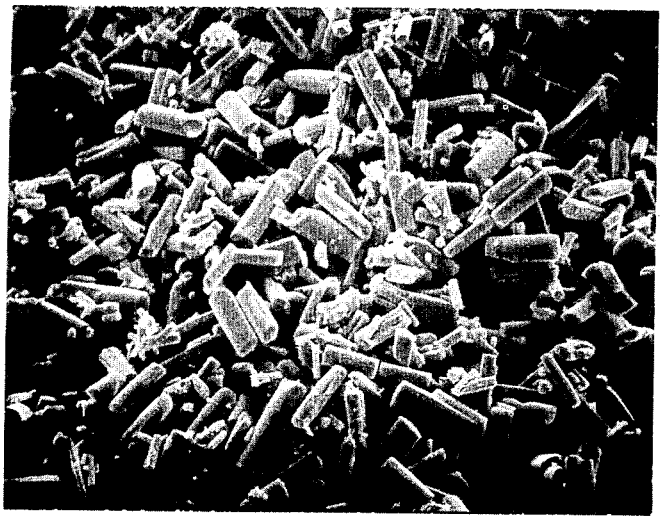
FIG. 1 is a photograph of crystals recovered from ammonium polyphosphate solution prepared by concentrating and ammoniating wet process orthophosphoric acid, which has not been treated according to the process of the present invention.
Figure 2:
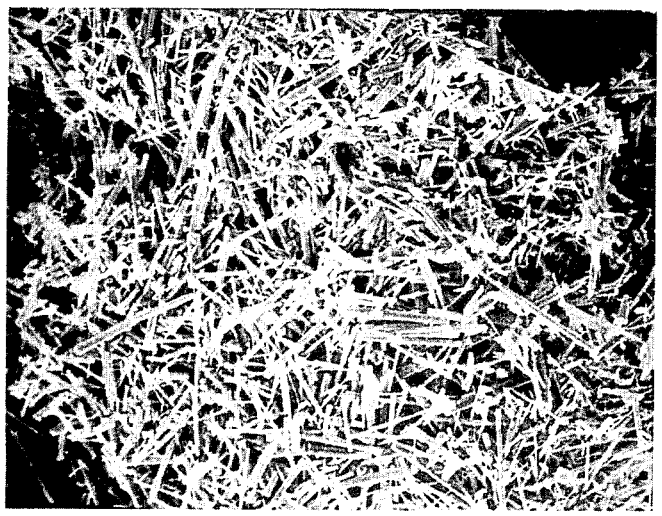
FIG. 2 is a photograph of crystals recovered from ammonium polyphosphate solutions prepared by concentrating and ammoniating wet process orthophosphoric acid which has been treated according to the present invention.

The present invention is based on the discovery that chloride ions added to an ammonium polyphosphate solution prepared from wet process orthophosphoric acid, which normally suffers from precipitate formation due to the presence of impurities inevitably present, will modify the crystal morphology of the precipitate such that the resulting crystals will remain suspended in the solution, showing little if any propensity to settle out of the solution.

Wet process orthophosphoric acid or wet process superphosphoric acid used in the present invention, is conventionally prepared by treating phosphate rock with sulfuric acid, then filtering out calcium sulfate. The phosphoric acid is then concentrated by water evaporation to 56 to 65% $P_2O_2$ and then neutralized with ammonia by conventional means to form liquid phase ammonium phosphate. In the case of superphosphoric acid, the phosphoric acid is concentrated to superphosphoric acid and then ammoniated. The heat of neutralization is used to drive off water, thereby resulting in the formation of ammonium polyphosphate.

The ammonium polyphosphate solutions being treated in accordance with this invention are those wherein 40-100%, and preferably 40-75% of the phosphate is in the form of polyphosphate.

The ammonium polyphosphate solution treated by the present technique is one having a nitrogen content 8-12% and a $P_2O_5$ content of 28-38%. Common grades of ammonium polyphosphate solution are 10-34-0, 11-37-0, 8.5-37-0, 11-31-0, 8.5-31-0, 8-30-0, and dehydrated and diluted forms thereof.

Precipitation begins to occur almost immediately, but it does not begin to manifest itself as a substantial problem until 1 or 2 weeks after precipitation begins, when the precipitate starts to settle out. The precipitate tends to be crystals which become gummy or gelatinous. It forms a layer at the bottom of containers filled with the ammonium polyphosphate solution.

The extent of precipitate formation in wet process ammonium polyphosphate is not as great as occurs in wet process ammonium orthophosphate, which is usually so severe that the solution often entirely gels up.

The source of chloride ions admixed with the ammonium polyphosphate solution may be selected fom a variety of water soluble chloride compounds. For instance, suitable sources of chloride ions include hydrochloric acid, HCl gas, $Cl_2$, ammonium chloride, alkali or alkaline earth metal chlorides, including but not be limited to NaCl, KCl, LiCl, $CaCl_2$ or $MgCl_2$.

It is preferable, however, to use compounds which are non-toxic and of low corrosivity as the source of Cl−.

In another embodiment of this invention, it has been found that the presence of K+in the solution reduces the rate of precipitate formation. Thus, a combination of K+ and Cl−will result in a delayed precipitate formation and, once the formation does begin to occur, a modification of the crystals into long and thin needle-like shapes which do not demonstrate a propensity to settle out of the solution occurs. It is therefore most preferred to use KCl as the Cl− source as a technique for the simultaneous introduction of K+ and Cl−.

It is, or course, well known to introduce KCl into fertilizer solutions when the N-P-K of the solution is desired to have a K value of other than 0. However, in the usual situation, the ammonium polyphosphate solution is prepared by the manufacturer and is shipped to a distributor where it is custom blended with water, potash and/or urea and/or ammonium nitrate or other nitrogen-containing materials to meet the purchasers' specific requirements. By the time the solution is shipped to the distributor and held before custom blending, the precipitation problem will have already manifested itself and it will be too late for the addition of KCl to modify the crystal structure of the precipitate.

Even if the custom blending were to occur at the point of manufacture, which is often the situation, the quantity of KCl added is relatively massive, as compared with the quantity of KCl added in accordance with the present invention. In the present invention, the quantity of KCl added to the solution is not sufficient to justify identification of the K+ content in the N-P-K rating. Moreover, the quantity of KCl added according to this invention is sufficient to alter the crystal structure, but not sufficient to prevent crystallization from occurring at all. Massive addition of KCl will tend to reduce the solubility of all dissolved materials and impurities and cause precipitation. According to the present invention, small amounts of KCl are added to delay the rate of crystal formation, but the amounts added are not sufficient to prevent crystal formation. Moreover, the crystals which do form are characterized by a length to width ratio of at least 2 times greater than the length to width ratio of crystals which will form in the absence of KCl addition.

While it is known to add potash to ammonium orthophosphate acid fertilizers to enhance the N-P-K, addition to orthophosphoric acid would have no effect on stability of the solution. In contrast, the addition of potash to ammonium polyphosphate enhances stability.

When only chloride ions are added, the resulting liquid fertilizer will tend to be somewhat thicker in viscosity, but will nevertheless be pumpable. While this product is satisfactory, the incorporation of potassium ions helps prevent the formation of the somewhat thicker, often gel-like solution. In addition, the presence of potassium ions reduces the rate of precipitate formation. Accordingly, it is preferable to add both chloride ions and potassium ions to the liquid fertilizer.

The source of potassium ions is not critical and any source which yields potassium ions in solution may be used. Suitable sources of potassium ions include potassium hydroxide, potassium carbonate, potassium chloride, potassium phosphates, or the like. The most preferred source is potassium chloride since it can function simultaneously as the chloride ion and potassium ion source.

The quantity of chloride ions added need only be sufficient to increase the length to width ratio of the crystals by a factor of at least 2, and preferably by a factor of at least 3, as compared to the length to width ration of crystals forming in the absence of Cl− addition. Good results are attained when the quantity of Cl− added is in amounts of from 0.5% to 2% Cl−. When KCl is the chloride source, good results are attained using a minimum of 1% KCl by weight to a maximum of 4.5%. Beyond 4.5%, there is no further improvement in crystal structure formation. The amount of potassium ions added is not critical so long as it is less than fertilizer amounts; that is, it is used in additive amounts. If excessive quantities of potassium ion is added, such as fertilizer amounts, the solution then contains much higher amounts of chemicals in solution leading to increased precipitation and undesirably raising the freezing point and causing strong problems in colder climates. Accordingly, the amount of potassium ions added is less than the amount which increases the impurity precipitation rate. More preferably, the amount of potassium ions added ranges fom 0 to 4.5% K+, and preferably from 0.5–2.0% and most preferably from 2.0 to 3.0% KCl. The exact amount of potash required to achieve the objectives of this invention is dependent upon several factors. The amount of impurities in the liquid ammonium polyphosphate and the ratio of one impurity to another impurity are considered to be prime factors in determining the amount of KCl used. For ammonium polyphosphates containing very low impurities, KCl levels at less than 1% by weight are considered feasible.

It is possible to vary the ratio of potassium to chloride ions when using potassium chloride as one source of the ions. This is accomplished by adding a suitable second source of either chloride ions or potassium ions, such as HCl, ammonium chloride, potassium hydroxide, potassium phosphates, or the like.

The time of addition of the chloride ions and the potassium ions, if added, is critical. If the benefits of the present invention are to be attained, these ions must be added within 120 hours after the ammoniation of the wet process orthophosphoric acid or wet process superphosphoric acid is completed. It is preferable, however, to add the ions within 24 hours of completing the ammoniation process. It is most preferable to add the ions before any precipitate forms. The ions may be added immediately after completion of the ammoniation step, if this is convenient.

It is also possible to added a suspending agent, such as a finely divided inert material, to help keep the crystals suspended. Suitable inert materials as are those disclosed in the Slack et al U.S. Pat. Nos. 3,109,729 and 3,113,858 and include clay, dolomite and other naturally occurring mineral materials. Particularly preferred are attapulgite and bentonite. The use of these materials is not necessary to maintain the impurity precipitates in suspension. Since the addition of these materials will increase the cost as well as the viscosity of the liquid fertilizer, it is desirable to use the smallest amount necessary to achieve the desired results. Preferably, less than 2 wt% based on fertilizer solution is added. Still more preferably, from 0.5 to 1.0 wt% based on the liquid fertilizer are added. These type suspensions have very limited storage (few days) before settling occurs. Since these materials are not necessary to maintain the impurities in suspension, it is preferable not to add them since their use increases the cost of the fertilizer solution.

The sources of chloride and potassium ions may be added at any convenient point in the process after ammoniation is complete. For example, the source may be added to process piping, to an agitated storage vessel, to the disengaging column which separates the unreacted gases from the liquid product following ammoniation or to a pipe transporting the liquid. The only critical aspect to the addition of these ions is that they be added within 120 hours after completion of the ammoniation of the wet process phosphoric acid.

The technique of the present invention is applicable to any grade of fertilizer solution. Some common grades of fertilizer solutions are:

| nitrogen | phosphorus | potassium |
|---|---|---|
| 10 | 34 | 0 |
| 11 | 37 | 0 |
| 8.5 | 37 | 0 |
| 11 | 31 | 0 |
| 8.5 | 31 | 0 |
| 8 | 30 | 0 |
| 12 | 42.5 | 0 |
| 12 | 41 | 0 |

The fertilizer solutions are often custom blended by the distributor to meet the particular needs of the farmer. For example, potassium may be added since this is an essential plant nutrient. The custom blending by the distributor can be accomplished using the liquid fertilizer of the present invention after the formation of the long, thin crystals, in the same manner as with conventional liquid fertilizers. Some common grades of liquid fertilizers which are prepared by custom blending are:

| nitrogen | phosphorus | potassium |
|---|---|---|
| 8 | 4 | 8 |
| 8 | 8 | 8 |
| 9 | 9 | 9 |
| 10 | 10 | 4 |
| 10 | 10 | 5 |

The post precipitate from ammonium polyphosphate discussed in the following examples was identified by X-ray diffraction.

Having generally described the invention, a more complete understanding can be obtained by reference to certain specific examples, which are included for purposes of illustration only and are not intended to be limiting unless otherwise specified.

EXAMPLE 1

Rate of KCl Addition

Several experimental tests were conducted to determine the proper amount of KCl to be added to the liquid ammonium polyphosphate. In one example, potash (KCl) was added to a sample of ammonium polyphosphate solution having an untreated analysis as given in Table 1.

TABLE 1

Analysis of Liquid Ammonium Polyphosphate

| % N | 10.0 | % Al$_2$O$_3$ | 1.10 |
|---|---|---|---|
| % P$_2$O$_5$ | 34.7 | % Fe$_2$O$_3$ | 1.17 |
| % Poly | 70.4 | % MgO | 0.505 |
| pH | 6.2 | % F | 0.35 |
| Sp.Gr. | 1.408 | | |

A fresh product sample of the above was divided into six portions to which KCl was added to give weight percentages of 0, 1.0, 1.5, 2.0, 2.5 and 3.0. These portions were observed for amount of precipitation and settling of both the precipitate and carbonized organics. After 2 weeks' storage, the untreated sample (0%KCl) showed extensive settling of the precipitate and organics. The sample with 1% KCl added had only moderate settling; those with 2% KCl or greater showed no settling of precipitate and a very little organic settling. It was also noted that the amount of precipitate in portions containing KCl was generally less than that of the untreated sample. The conclusions from these tests and other data are that the potash is quite effective in accomplishing two objectives: (1) retarding formation of the precipitate and (2) preventing the settling of the precipitate and carbonized organics.

The post-precipitant material which slowly settles out of 10-34-0 fertilizer solution consists primary of water-insoluble magnesium pyrophosphate complexes. The amount of this material present in 10-34-0 can be determined gravimetrically by diluting and filtering a weighed sample of fertilizer.

EXAMPLE 2

Table 2 presents data on settling of these test solutions. Samples were place in 7-inch high containers and allowed to settle undisturbed for two weeks. The depth of clear layer at the top of each solution was then measured. The greater the depth of clear liquid, the more the solids have settled. As the layer becomes greater, the solids are also compacting into a troublesome mass. Ideally, the amount of clear layer should be zero.

TABLE 2

Amount of Clear Layer After Two Weeks Period

| Material | Depth of Clear Layer, In. |
|---|---|
| Untreated solution | 4.5 |
| Treated with 1% KCl | 3.25 |
| Treated with 1.5% KCl | 3.0 |
| Treated with 2.0% KCl | 2.5 |
| Treated with 2.5% KCl | 1.5 |
| Treated with 3.0% KCl | 0.5 |

The samples shown in Table 2 were shaken at the end of 2 weeks and allowed to settle again. The untreated sample showed extensive settling after 24 hours, while those with 2% to 3% potash showed no settling at all, even after 5 months' storage.

EXAMPLE 3

Effect of Different Types of Potash

Reagent grade, white soluble and "red" potash were tested to see if the grade of potash affected the results. Due to impurities in the red potash, it took somewhat longer to dissolve in the ammonium polyphosphate liquid but this is no real significance. Results on preventing settling, however, were the same for all types of KCl. Based on lower cost, red potash is the preferred raw material.

EXAMPLE 4

Effect on Preparation of Mixed Grades

As mentioned earlier, liquid ammonium polyphosphate is used as a raw material for such mixed grades as 8-8-8 and 4-10-10. Experimental tests were set up on these two grades using untreated liquid ammonium polyphosphate and ammonium polyphosphate containing 2.0, 2.5 and 3% KCl. After as little as 20 hours, settling was observed even after 6 days in the postash treated samples.

EXAMPLE 5

KCl, NH$_4$Cl and NaCl were added to freshly prepared 10-34-0 in amounts such that each solution contained 1.2% chloride ion. On prolonged aging, no treated sample showed any settling. However, the NH$_4$Cl and NaCl treated solutions became considerably thicker, while the fluidity of the KCl treated solution remained virtually unchanged.

FIG. 1 is a photograph of the precipitate which occurs in the untreated ammonium polyphosphate employed in the foregoing examples. The relatively small length to width ratio of the crystals permits the materials to settle out within 24 hours. The carbonized organics also settle out along with the complex which causes the formation of a dense sludge layer in the storage container. When KCl is added before precipitation, the crystals formed are needle-like, having a large length to width ratio as shown in FIG. 1. The settling rate of these crystals is relatively low because of the large surface area of the crystals. Additionally, it has been found that the addition of KCl not only results in reducing settling of the crystals, but also aids in holding the carbonized organics in suspension. Samples treated with KCl exhibited almost no settling, even after storage for 5 months. The chloride additive modifies the crystal dimensions which results in crystals which do not settle.

Figure 3:
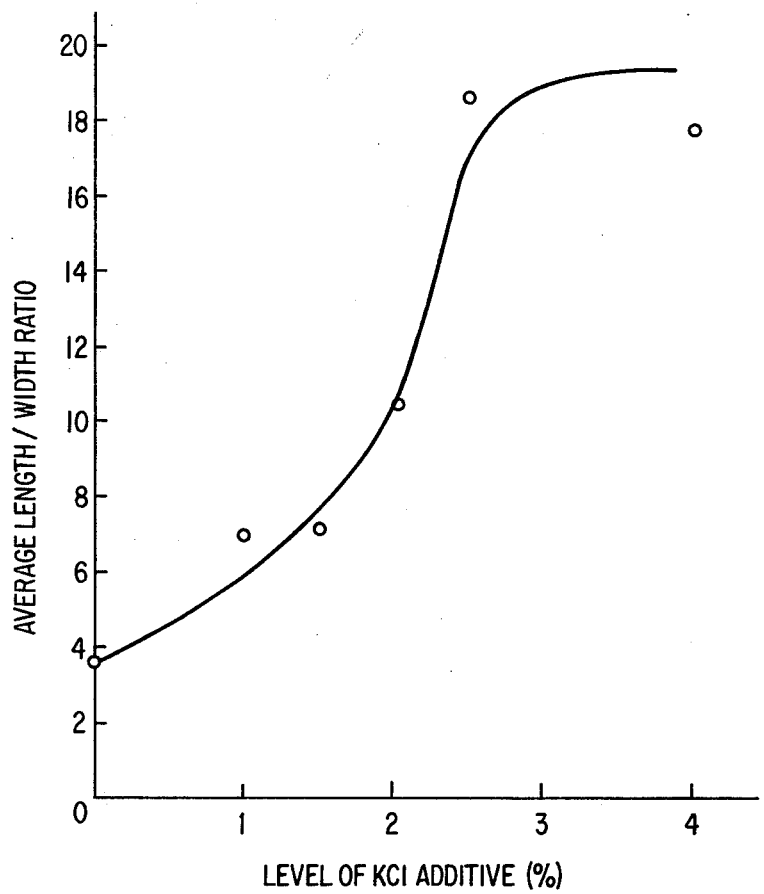
FIG. 3 is a graph showing the average length and width ratio of precipitation crystals as a funtion of level of KCl additive.

FIG. 3 shows the length/width ratio of precipitated crystals of impurities as a function of KCl additives added (in weight percent). The measurements were taken from electron photomicrographs. As can be seen in the graph, even 0.5 wt.% KCl shows an increase in the length/width ratio. Good solution stability begins at a length/width of about 6.0 which corresponds to a potash additive level of 1.0% KCl, and the upper limit would be the maximum solubility of KCl in the solution.

Having now fully described the invention, it will be apparent to one of ordinary skill in the art that many changes and modifications can be made thereto without departing from the spirit or scope of the invention as set forth herein.

What is claimed as new and desired to be secured by Letters Patent is:

1. A method of impeding the formation and the settling of precipitate crystals in liquid ammonium polyphosphate containing fertilizer solutions prepared by concentrating and ammoniating wet process phosphoric acid which comprises adding within 120 hours of completing the preparation of said ammonium polyphosphate containing solution a quantity of chloride ions to the liquid fertilizer solution in amounts sufficient to alter the morphology of the precipitate crystals such that the length to width ratio of the crystals formed is increased by at least 200% as compared to the ratio for crystals formed in the absence of Cl− addition.

2. The method of claim 1, wherein the source of chloride ions is added within 24 hours of the preparation of the ammonium polyphosphate containing solution.

3. The method of claim 2, wherein the source of chloride ions is added prior to precipitate formation.

4. The method of claim 1, wherein the source of chloride ions is selected from the group consisting of hydrochloric acid, HCl gas, $Cl_2$, ammonium chloride, alkali metal chlorides, alkaline earth metal chlorides, and mixtures thereof.

5. The method of claim 4, wherein the source of chloride ions is at least one member selected from the group consisting of ammonium chloride, sodium chloride, potassium chloride, calcium chloride and HCl.

6. The method of claim 5, wherein the source of chloride ions is potassium chloride.

7. The method of claim 6, wherein the potassium chloride is added as red potash.

8. The method of claim 1, wherein a sufficient quantity of the chloride ion source is added to increase the ratio of the length to width of the precipitate crystals by a factor of at least 300% when compared with crystals formed when no source of chloride ions is present.

9. The method of claim 1, wherein the amount of the chloride ion added is sufficient to provide from 0.5 to 2.0 wt% of chloride ions in the liquid fertilizer.

10. The method of claim 1, wherein potassium ions are introduced into said solution.

11. The method of claim 10, wherein a sufficient quantity of potassium ions is present in an amount sufficient to reduce the rate of impurity precipitate formation but leas than the fertilizer amounts.

12. The method of claim 10, wherein the potassium ion content of the liquid fertilizer is from 0.5-2.0%.

13. The method of claim 1, wherein the potassium ions are introduced in the form of a member selected from the group consisting of potassium hydroxide, potassium carbonate, potassium phosphate and potassium chloride.

14. The method of claim 13, wherein the source of potassium ions is potassium chloride.

15. The method of claim 14, wherein the source of potassium chloride is red potash.

* * * * *